United States Patent
Thielens

Patent Number: 5,915,041
Date of Patent: Jun. 22, 1999

[54] METHOD AND APPARATUS FOR EFFICIENTLY DECODING VARIABLE LENGTH ENCODED DATA

[75] Inventor: John B. Thielens, Wayne, Pa.

[73] Assignee: Unisys Corporation, Blue Bell, Pa.

[21] Appl. No.: 08/644,930

[22] Filed: May 13, 1996

Related U.S. Application Data

[63] Continuation of application No. 08/026,347, Mar. 4, 1993, abandoned.

[51] Int. Cl.$^6$ ............................................ G06K 9/36
[52] U.S. Cl. ........................................... 382/232
[58] Field of Search ........................ 382/232, 239, 382/233, 240, 246; 341/65; 358/427

[56] References Cited

U.S. PATENT DOCUMENTS 4,955,066  9/1990  Notenboom ................... 382/56
5,253,053  10/1993  Chu ............................ 382/56

*Primary Examiner*—Jose L. Couso
*Attorney, Agent, or Firm*—Nathan Cass; Mark T. Starr

[57] ABSTRACT

The present invention relates to a method and apparatus for performing decoding of variable length data. It is particularly effective when decoding data encoded with a Huffman or such similar encoding method. The invention employs a plurality of decoding tables which permits a fixed length of bits to be decoded in a minimum number of indexes for the size of the index. Each table is constructed such that the given node indicates whether a unique character has been decoded or whether further decoding is necessary.

For data which is encoded in a manner similar to a Huffman code, a properly constructed table will yield the frequently used characters on a single index. Only less frequently used characters require multiple indexes into the plurality of tables.

6 Claims, 6 Drawing Sheets

| INDEX | 0 | 1 | 2 | 3 | 4 | 5 | 6 | 7 |
|---|---|---|---|---|---|---|---|---|
| BITS | 000 | 001 | 010 | 011 | 100 | 101 | 110 | 111 |
| DATA | A | B | A | C | A | B | A | D |
| CONSUME | 1 | 2 | 1 | 3 | 1 | 2 | 1 | 3 |

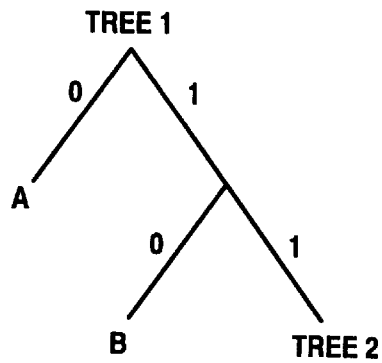
Figure 2B
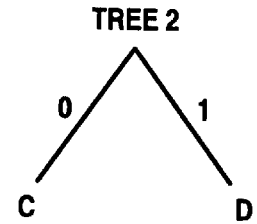
Figure 2C
| INDEX | 0 | 1 | 2 | 3 |
|---|---|---|---|---|
| BITS | 00 | 01 | 10 | 11 |
| DATA | A | B | A | TREE 2 |
| CONSUME | 1 | 2 | 1 | 2 |
Figure 3B
| 0 | 1 | 2 | 3 |
|---|---|---|---|
| 00 | 01 | 10 | 11 |
| C | D | C | D |
| 1 | 1 | 1 | 1 |
Figure 3C

METHOD AND APPARATUS FOR EFFICIENTLY DECODING VARIABLE LENGTH ENCODED DATA

This application is a continuation of patent application Ser. No. 08/026,347, filed Mar. 4, 1993, now abandoned.

FIELD OF THE INVENTION

The present invention relates to a method and apparatus for performing decoding of variable length data. The present invention is particularly effective when decoding data encoded with a Huffman or such similar encoding method.

BACKGROUND OF THE INVENTION

In the art of information storage and transmission, it is known that the representation of such data often contains redundant information. By way of explanation it is necessary to know that information in such data storage or data transmission systems is usually represented by some number of bits as determined by the given character scheme employed by the system. In such a scheme a fixed number of bits is used to represent every possible character in the set.

By way of example, if the character size is eight bits in length then up to 256 characters may be represented by these eight bits. While this provides a standard method of character representation, it can greatly increase the size of the data stored or transmitted as each character always requires the full character size (e.g. eight bits).

In such data transmission or data storage systems, it is therefore valuable to have a method of altering the size of the representation of each character such that frequently used characters consume less of the available resource in use. Such a process is often referred to as "data compression".

Data compression increases the density of the data stored while retaining all of the original information. Compressing the data permits it to be stored in smaller amounts of storage area. It also permits the data to be transmitted over a communication connection in less time. Employing such compression provides significant reduction in the cost of storing or transmitting data.

A well known method of performing data compression is the use of variable length encoding method. A well known such method is referred to as a Huffman code. A Huffman code converts data of a uniform character length into encoded data of variable length. The construction of Huffman codes is further described in an article by David Huffman entitled "A Method For The Construction of Minimum Redundancy Codes" in the proceedings of the I.R.E., Volume 40, pages 1098 to 1101, 1952. Such a method is often preferred over other variable length codes due to the straight forward nature of the construction of the encoded data and the optimum expected average length of the encoded characters.

While variable length encoded data is useful for reducing the cost of performing transmission or storage of data, the encoded data cannot be used by the destination system in such a form. As such encoded data must eventually be decoded back to its fixed length format. As such, there is a need for a convenient, efficient and practical way to decode variable length encoded data. Ideally, such a method could be employed in a conventional data processing system.

There is also a need to perform such decoding in the most rapid manner possible since the speed of such decoding effects the efficiency of the entire system employing the encoded data. For example, it is desireable that a fax machine decode variable length encoded data it receives in a rapid fashion to increase the amount of data the machine can process.

Variable length encoded data frequently requires that the encoded information be processed one bit at a time. Since the length of the data is variable, it is uncertain how many bits comprise a given character. One method of decoding begins with the first bit and does a comparison to determine if that length of data corresponds to a character in the encoded set. If not, successive single bits from the encoded data are concatenated to the first bit until a unique character is decoded within the system.

SUMMARY AND OBJECTS OF THE INVENTION

The primary object of the present invention is to provide an improved method of decoding variable length encoded data into a fixed length format.

It is another object of the present invention to perform such decoding in a rapid manner to provide for the more efficient performance of systems employing variable length encoded data.

It is a further object of the present invention to provide a decoding method that will improve the efficiency of the system employing it by handling the encoded data in a minimum of decoding time. This is accomplished by handling multiple bits of the encoded data rather than a single bit at a time.

The invention employs a plurality of decoding tables which permits a fixed length of bits to be decoded in a minimum number of indexes for the size of the index. Each table is constructed such that the given node indicates whether a unique character has been decoded or whether further decoding is necessary. A node at which a unique character is available is referred to as a leaf node. A leaf node provides the character for the index as well as the number of bits of the encoded data which should be consumed as part of the decoding.

If a node is not a leaf node then further bits are needed to uniquely identify the character encoded. The full length of the index bits is consumed and the next fixed length set of bits is used as an index into the next table in the plurality of decoding tables until a leaf node is encountered. In a preferred embodiment of the present invention, each node which is not a leaf node includes an indicator identifying which table to employ as the next decoding table to use.

For data which is encoded in a manner similar to a Huffman code, where frequently occurring characters employ a smaller number of bits to represent the character, a properly constructed table will yield the frequently used characters as leaf nodes on a single index. Only less frequently used characters, which require more bits to be represented, will require multiple indexes into the plurality of tables.

BRIEF DESCRIPTION OF THE DRAWINGS

The invention will be better understood from the following description when considered with accompanying drawings.

FIGS. 2A, 2B, and 2C are binary trees depicting an example of a variable length encoding method.

FIGS. 3A, 3B, and 3C depict examples of decoding tables employed in preferred embodiments of the present invention.

DETAILED DESCRIPTION OF THE PREFERRED EMBODIMENTS

As described above the present invention employs a method of decoding variable length encoded data by means of a plurality of decoding tables. These tables are constructed in a manner which takes advantage of the characteristics of the given system in which the invention is employed. That is, the tables are constructed to permit the most rapid indexing method available for the given system.

Figure 1:
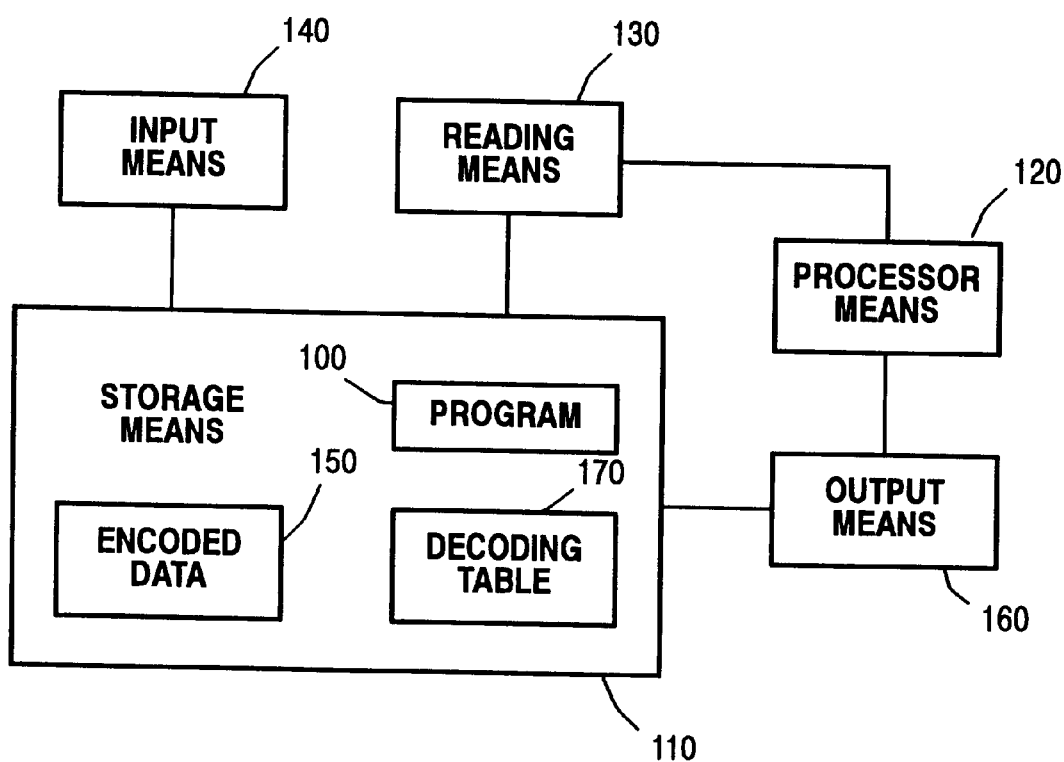
FIG. 1 is a depiction of a computer system as employed in the preferred embodiment of the present invention.

In a preferred embodiment of the present invention depicted in FIG. 1, the decoding is carried out by a computer program 100. The computer program 100 is present in a storage means 110 which may be accessed by a processor means 120 via a reading means 130. As shall be further explained hereinafter, processor means 120 employs decoding table 170 in accordance with the instructions of program 100 to decode encoded data 150 for further use.

Input means 140 stores the encoded data 150, in said storage means 110. The encoded data 150 may have come from a variety of sources to which input means 140 is connected. For example, one such source might be a disc storage means in which the encoded data 150 is stored. Another example of a source for said encoded data 150 is a transmission line such as a phone line over which encoded data 150 is transmitted and stored in said storage means 110 via said input means 140.

Output means 160 outputs the resulting decoded data as appropriate for the given embodiment. For instance, the decoded data may be displayed on a user terminal device for a person to read. Alternatively, decoded data may be stored in a disc storage. Another possible output would be to send the decoded data to a printer.

An example of a preferred embodiment for the present invention is an industry standard personal computer including a central processor which has access to a memory and means for accessing a source of encoded data such as a input/output port or a disc drive. Another preferred embodiment is a fax machine which includes a processor to perform decoding which accesses a memory to store data transmitted over a phone or other transmission line for storage in said memory.

Figures 2A, 3A:
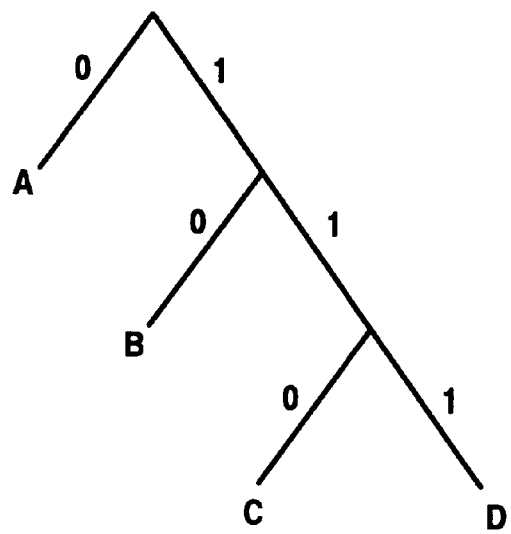

FIG. 2A depicts a simple example of a binary tree which includes a set of data items stored in accordance with a variable length encoding method. An example of such an encoding method is a Huffman code as described in the reference cited above. As can be seen in FIG. 2A the encoded data is assigned values such that the most frequently used data item will have the shortest expected code word length. The encoding is based on the probability distribution for the given set of data employed.

In FIG. 2A the right branches represent a binary value of 1 while left branches represent a binary value of 0. To determine the decoded value of a given series of bits, start at the root of the tree and follow the appropriate branch for each bit in the series until a data item is reached. A node at which a data item is found is called a leaf node.

For the present example only four data items need be represented, A, B, C and D. For sake of explanation, it is assumed that A is the most frequently occurring data item of the four in the set. As such, A has been assigned a single bit value of 0 in this encoding example. The letter B is the second most frequently occurring value so it has a two bit value of 01. The values of C and D are represented respectively by a three bit value where in C is represented by 011 and D is represented by a series 111.

While this is a simple example, it should be apparent to one skilled in the art that as more data items are added the tree would extended appropriately for the given number of data items. Such an extension would also increase the number of bits necessary to represent all of the possible data items.

When a series of data is encoded it is packed together. Only by decoding one data item at a time from the beginning of the series can one determine each data item in the series.

As mentioned earlier, computer systems such as those employed in the preferred embodiment depict data in a fixed length format; typically a "word" for the given system. For a PC, a word is usually 16 bits or 32 bits in length. For a PC with a 16 bit word, the one bit representation of "A" in the example encoding method must be translated to the 8 bit representation for the computer system. For the present invention such decoding is accomplished by means of a decoding table such as shown by example in FIG. 3A.

To represent any of the four characters in the data set for FIG. 2A requires a maximum of three bits. Row 2 of the table in FIG. 3A, labeled BITS, shows the eight possible permutations of a three bit series. Row 1 of this table, labeled INDEX, shows the decimal equivalent of the binary value of each given three bit series. For example, the series of bits 010 has a decimal value 2. Row 3 of the table, labeled DATA, is the character data that is associated with a given bit value. Row 4 of the table, labeled CONSUME, indicates the number of bits which should be consumed from the input series upon translating the bits to a character.

For the present example, the character "B" is represented by a two bit series of the value 10. On examining each of the values in the BITS row from right to left it can be seen that the values in columns 1 and 5 have a 10 in the right most two bits. This corresponds to a data value of "B" in both cases. Two bits are consumed upon translating this character.

FIGS. 2B and 2C show how multiple trees may be defined in the present invention for the situation where the number of bits in the index is less than the total number of bits necessary to represent all valid charaters in the translation set. For this example, assume that the index is two bits in length. Since both characters "C" and "D" require three bits to be represented, it is not possible to translate all valid characters with a single index.

Tree 1 in FIG. 2B depicts how the most frequently occurring characters, "A" and "B", are stored as leaf nodes in the first tree. These may both be translated on a single two bit index. Characters "C" and "D" are translated via a two step process using a table represented by Tree 2 in FIG. 2C. FIGS. 3B and 3C show an example of the tables corresponding to FIGS. 2B and 2C respectively.

For the characters "C" and "D", the two bit index 11 into the table in FIG. 3B yields an indicator to go to the table for Tree 2 in FIG. 3C using the next two bits in the sequence. Two bits are consumed and the next two bits in the series are employed to index into the table indicated by the index into tree 1. If the right most bit in the new index is 0, the complete 3 bit sequence was 011, and the translated character is "C". If the right most bit in the new index is 1, the complete 3 bit sequence was 111, and the translated character is "D". For either character, one bit is consumed to complete the three bit translation.

Figure 4:
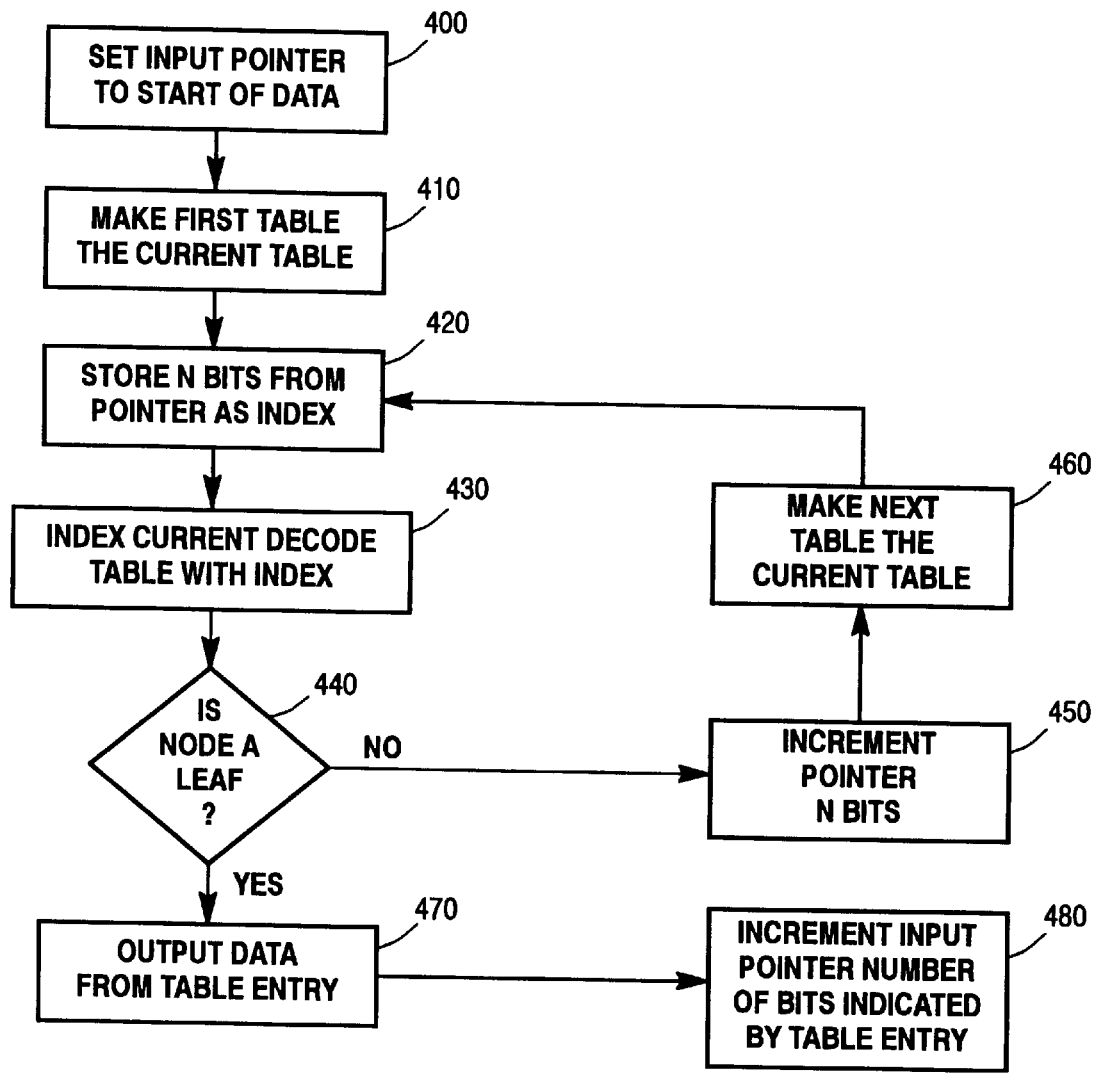
FIG. 4 depicts the steps involved in decoding an element of information employing the present invention.

FIG. 4 shows an example of the steps involved in decoding an element of information employing the present invention. The process begins 400 by setting the input pointer to point at the first bit of the input data. Next, the first table in the series of decoding tables is designated the current table in use 410. Example of such tables are shown in FIGS. 3A–C.

The first N bits at the input pointer are stored in the index for the table 420. The value of N is determined by the appropriate fixed data length for the system. This is usually the word size for the system.

The index is used to access the current decoding table 430. The node accessed with the index is checked 440 to determine if it is a leaf node. One method to indicate that a node is not a leaf node is to place an invalid value in the data field of the node.

If the node is not a leaf node then the input pointer is incremented by N bits 450. This "consumes" or discards the full length of the most recent input index data. Proceed to the next decoding table 460 before repeating steps 420, 430, and 440 to handle the next N bits of input data. In a preferred embodiment of the present invention, an indicator in the non-leaf node identifies which table to employ as the next decoding table to use to continue the decoding.

If the node at step 440 is a leaf node, then the data value associated with that node is output from the table 470. The input pointer is incremented 480 by the number of bits indicated in the consume field of the node to remove that number of bits from the input. Thus, a single character has been decoded from the input data. Subsequent characters for the same set of input would be decoded in a similar method by returning to step 410.

Figure 5:
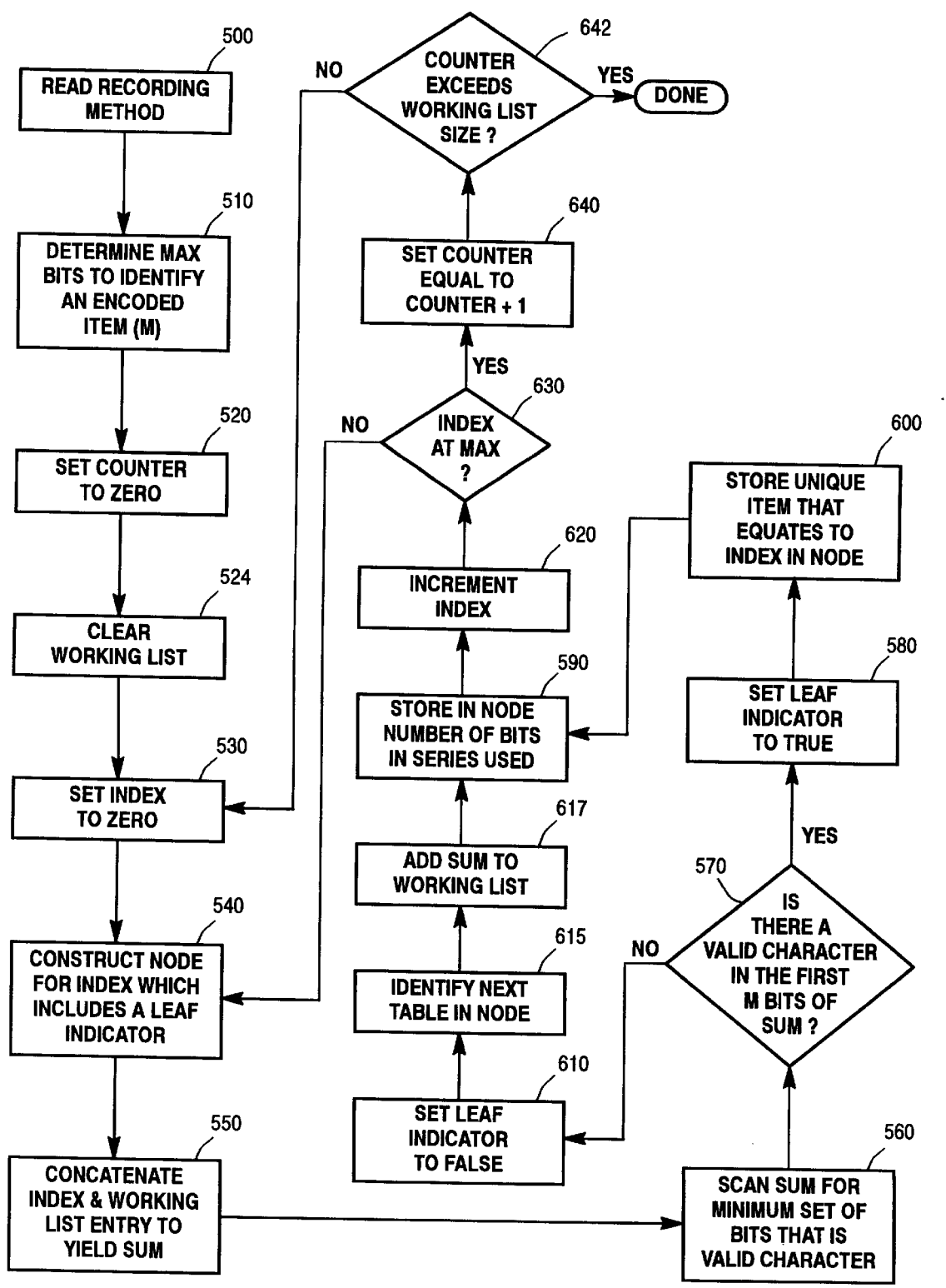
FIG. 5 presents the steps employed in creating a decoding table in a preferred embodiment of the present invention.

FIG. 5 presents the steps employed in creating a decoding table for use in the preferred embodiment of the present invention. The process begins by reading in the decoding method employed 500. Depending on the embodiment, this may be stored within the system or it may be transmitted from an external source such as another computer system.

Given the decoding method in use, it is necessary to determine 510 the maximum number of bits, M, needed to identify an encoded item for the method. This number of bits, together with the size of the index employed, will determine the total number of table entries needed to represent all the possible characters in the set.

The counter to be employed is initialized to zero 520 as is the index 530. The working list is also cleared 524.

The construction of a node for a given character begins 540 by acquiring the necessary storage associated with the index. Depending on the implementation, this may involve allocating and initializing a structure in memory or in disc storage.

The index and the counter are concatenated to yield a sum 550 where the sum has at least M bits in length. Scan the sum for the minimum set of bits that represents a valid character for the given encoding method 560. In a typical word on a computer system, this scan would begin at the right most bit and would end when a series of bits that represents a valid character is found or when a number of bits equal to that used in the index has been scanned.

When the search ends, determine if a valid character has been found 570. If a valid character is found, set the leaf indicator for the node to true 580. Store the unique data item that represents the character in the node 590.

If a valid character is not found at step 570, then set the leaf indicator for the node to false 610. This may be as simple as storing an invalid character in the character field of the node. In a preferred embodiment of the present invention, an indicator is stored in the node to identify which table to employ as the next decoding table to decode the character 615. The current value of sum is added to the working list 617.

For all nodes, store in the node the number of bits consumed by the decoding for that node 600. This is the number of bits scanned at step 560.

Once the node is complete, increment the index 620. Determine if the index is at its maximum value 630. Typically, the maximum for the index is equal to the maximum number of nodes to be created for this table. If it is not at the maximum, the system returns to step 540 to begin construction of the next node for that index value.

When the index for the current table reaches its maximum 630, counter is incremented by one 640. If counter exceeds the size of the working list 642, all tables have been constructed and the method is complete. Otherwise, the process continues at step 530.

Figure 6:
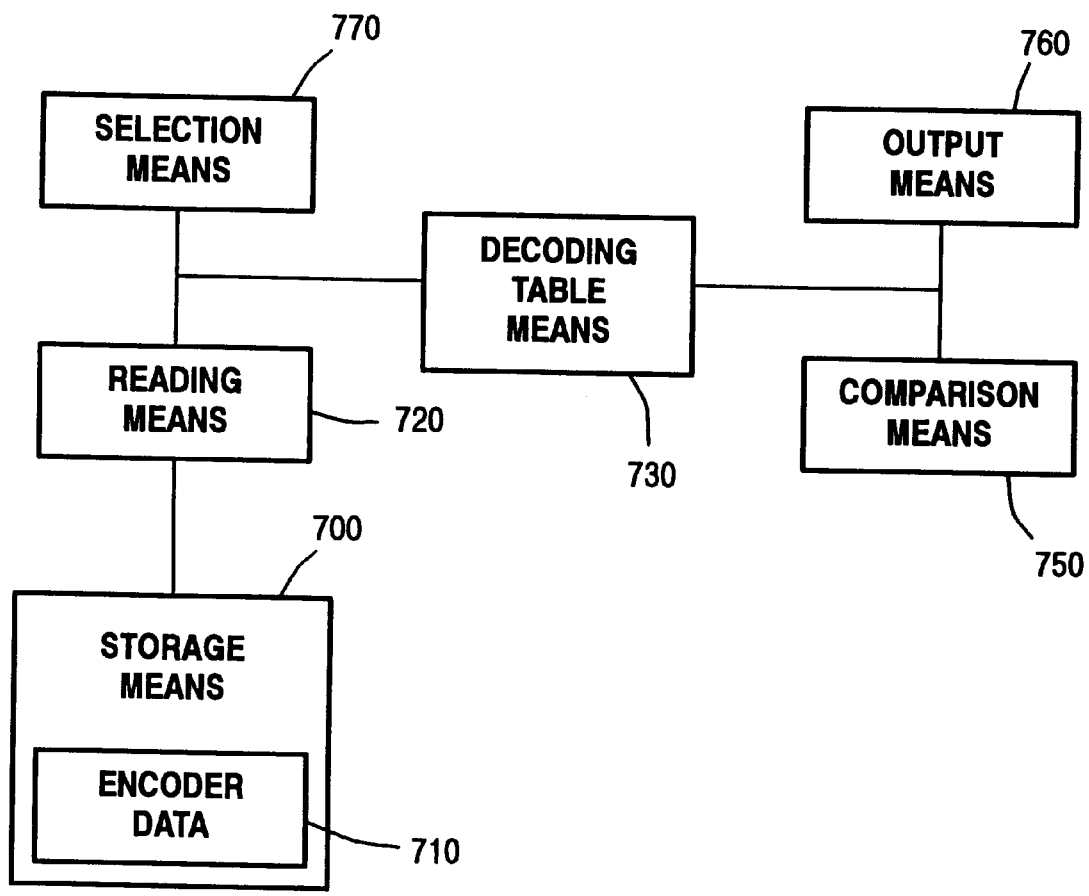
FIG. 6 depicts the elements of the system which employs the present invention.

FIG. 6 depicts the system which employs their present invention. Storage means 700 contains encoded data 710 which has been transmitted to said storage means from some source. This source could be a fixed storage, such as a disc drive, or it could be a communication path, such as from a fax machine connected to a phone line.

Reading means 720 is connected to storage means 700 and provides the ability to read the contents of storage means 700 including said encoded data 710. The number of bits of encoded data 710 read from storage means 700 by reading means 720 is ideally equal to the size of the index employed.

Indexing means 730 employs said bits of encoded data read by said reading means 720 to index into a decoding means 740. Decoding means 740 is constructed such that every possible index value has some representation in said decoding means. Said decoding means 740 may be a single large table or a series of smaller tables in the preferred embodiment.

Indexing means 730 indexes into said decoding means 740 to retrieve a particular entry in said decoding means 740. Comparison means 750 accesses the value retrieved by indexing means 730 from decoding means 740 to determine if said entry is a valid data item, also known as a leaf node entry. If the entry is a valid one, comparison means 750 signals output means 760 to output the character associated with said node.

Decoding means 740 signals selection means 770 how many bits of the input data were consumed to create the character output by output means 760. Using this information, selection means 770 signals reading means 720 where to begin the next read of data from storage means 700 to decode the next character.

Some of the many advantages of the present invention should now be readily apparent. For example, a novel decoding method and system has been provided which is capable of rapidly decoding characters encoded in a variable length data compression method for the given word length of the system in which the invention is employed. Obviously, many modifications and variations of the present invention are possible in light of the above teachings. It is therefore to be understood that the foregoing embodiments are presented by way of example only and that within the scope of the claims attached hereto the invention may be practiced otherwise than as specifically described.

What is claimed:

1. An electronically implemented method for decoding variable length encoded data comprising the steps of:

a) providing a first decoding table in a storage means having a plurality of table entries wherein a first plurality of table entries are leaf nodes corresponding to different length encoded data, each leaf node entry in said storage means storing first bits indicating decoded data and second bits indicating the number of bits corresponding to the length of the encoded data to be consumed, and wherein at least one table entry is an index node storing an index into a second table;

b) establishing an input pointer to the first bit of said variable length encoded data;

c) storing N bits of data from said encoded data beginning at said input pointer into an index;

d) indexing into said first decoding table by means of said index to find a table entry;

e) determining if the table entry corresponding to said N bits is a leaf node;

f) if the determined table entry is a leaf node, outputting the decoded data indicated by the first bits in the leaf node and incrementing said input pointer by the number of bits indicated by the second bits in the leaf node;

g) if the determined table entry is an index node rather than a leaf node, using the index therein as an index into said second table and incrementing said input pointer by N bits.

2. The method of claim 1, wherein said second table includes leaf node table entries and at least one index node table entry, further including the step of:

h) repeating steps a, b, c, d, e, f and g with said second decoding table if the determined table entry in said first table is an index node.

3. The method of claim 1, wherein said encoded data conforms to the Huffman encoding method.

4. The method of claim 1, wherein the value of N is a multiple of the number of bits in a byte.

5. An electronically implemented method of constructing a decoding table in a storage means to decode variable length encoded data wherein the resulting constructed decoding table corresponds to different length encoded data, said method comprising the steps of:

a) reading the encoding method employed to encode said encoded data;

b) determining M where M is the maximum number of bits required to uniquely identify a single encoded item for said encoding method;

c) initializing a counter to zero wherein the number of bits in said counter is at least as many as the maximum number of bits required to uniquely identify a single encoded item for said encoding method;

d) initializing an index to zero wherein said index is N bits in length;

e) constructing a node in said table corresponding to said index wherein said node includes a leaf indicator;

f) setting said leaf indicator to true for said node if any series of the first M bits of the sum of said index and said counter correspond to a unique item in said encoding method;

g) setting said leaf indicator to false for a node if no series of the first M bits of said sum correspond to a unique item in said encoding method;

h) storing first bits in said node indicating the unique data item which corresponds to said index for said node if said leaf indicator is set to true;

i) storing second bits in said node represented by said first bits if said leaf node indicator is true;

j) incrementing said index by one;

k) repeating steps e, f, g, h, i, j, and k if said index is less than N;

l) setting said counter equal to the value of sum plus one if said index is not less than N;

m) repeating steps d, e, f, g, h, i, j, k, l, and m if said counter is less than the maximum value of a variable with M bits.

6. The method of claim 5 wherein step (g) further includes the step of:

storing in said node an indicator of the identity of a table to use which corresponds to said index for said node if said leaf indicator is set to false.

* * * * *